United States Patent [19]

Schauder et al.

[11] Patent Number: 4,479,082
[45] Date of Patent: Oct. 23, 1984

[54] MOTOR CONTROL SYSTEM

[75] Inventors: Colin D. Schauder, Warwickshire; Roy Caddy, Leicestershire, both of England

[73] Assignee: The General Electric Company p.l.c., England

[21] Appl. No.: 404,720

[22] Filed: Aug. 3, 1982

[30] Foreign Application Priority Data

Aug. 12, 1981 [GB] United Kingdom ............... 8124625
Mar. 1, 1982 [GB] United Kingdom ............... 8205942

[51] Int. Cl.$^3$ ............................................. H02P 5/40
[52] U.S. Cl. ................................... 318/799; 318/809
[58] Field of Search ............................ 318/798–811

[56] References Cited

U.S. PATENT DOCUMENTS 3,700,986 10/1972 Cushman et al. .................. 318/799
4,132,931 1/1979 Okuyama et al. .................. 318/809
4,310,791 1/1982 Akamatsu .......................... 318/808

FOREIGN PATENT DOCUMENTS

WO81/0020- 76 7/1981 PCT Int'l Appl. .
2048516 5/1979 United Kingdom .

OTHER PUBLICATIONS

Hitachi Publication, Cycloconverter–Feb. Synchronous Motor drive 1AS78128F.
Field–Oriented Closed–Loop Control By Karl–Heinz Bayer et al., Siemens Review XXXIX, (1972), No. 5.

Primary Examiner—E. A. Goldberg
Assistant Examiner—Art Evans
Attorney, Agent, or Firm—Kirschstein, Kirschstein, Ottinger & Israel

[57] ABSTRACT

A motor control system in which an actual torque indication is derived from the motor and compared with a reference, or demand, torque. From the difference signal is derived a stator M.M.F. in magnitude and position relative to a reference frame locked to the rotor. Orthogonal components of this stator M.M.F. are derived and transformed to stator phase winding drive signals.

8 Claims, 9 Drawing Figures

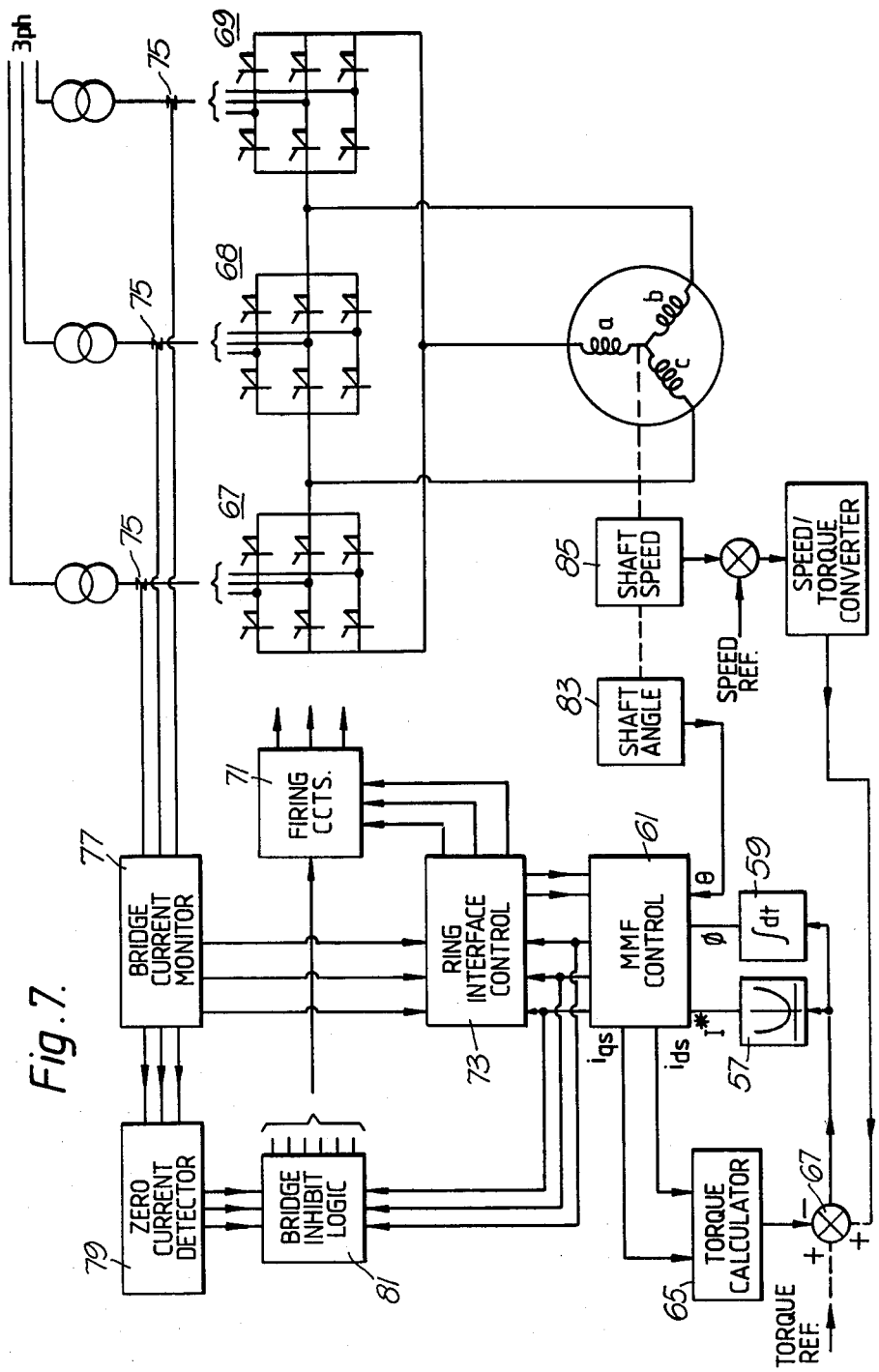

MOTOR CONTROL SYSTEM

This invention relates to motor control systems and particularly to a motor control system for torque control of an induction motor.

Most speed controlled drives found in industry are undemanding in terms of speed control bandwidth and operating range. In contrast, there are some applications where fast and accurate four quadrant control (i.e. drive and brake in both directions) is important. These applications range from small machine tool drives to the large reversing mill main drives in the steel industry, and their requirements have been adequately met by drives using dc machines supplied from static convertors. Apart from the familiar problems associated with the commutator, d.c. drives provide excellent response and are commonly available with torque control bandwidths of 500 rad/s and speed control bandwidths around 30 rad/s.

Alternative systems using a.c. motors with static power equipment have not to date offered a serious challenge to the d.c. drive in these specialised application areas, both because of their relatively high cost and their inability to match the performance specifications. However, present economic trends indicate that a.c. drives must eventually show overall cost advantages in relation to the equivalent d.c. system. In view of this it has become increasingly important to develop a control capability for a.c. motor drives which provides equivalent performance.

While such systems have been proposed for use with synchronous motors, the present invention is particularly concerned with a.c. drives employing induction motors and comparing in performance with dc systems.

The object of the present invention is therefore to provide an a.c. motor control system which is comparable in performance with existing d.c. systems and is at the same time financially practical.

According to the present invention, an induction motor control system comprises means for producing signals representative of desired values of stator-current amplitude and accrued slip-angle, means responsive to the rotor angular position to produce a rotor angle signal, means for resolving the stator-current amplitude signal into orthogonal demand components proportional to the sine and cosine of the accrued slip-angle signal, and forward transform means responsive to said demand components and to said rotor angle signal to produce equivalent stator-winding drive signals.

Each of said drive signals may be arranged to be combined with a negative feedback signal derived from a respective stator phase winding to provide direct control of the stator M.M.F.

Preferably, inverse transform means responsive to the rotor angle signal is provided for converting signals representing actual stator phase current into equivalent orthogonal actual components which rotate in synchronism with the rotor and vary as the sine and cosine of the accrued slip-angle, these actual components constituting negative feedback signals in a closed control loop.

In a system in which the motor stator carries no zero sequence component, one of the stator-winding drive signals is preferably derived as the negative sum of the remainder. Thus, the forward transform providing stator phase current values $i_{as}$ and $i_{cs}$ in terms of the orthogonal rotor-referenced components $i_{ds}$ and $i_{qs}$ may incorporate the matrix product $$\begin{bmatrix} \sin(\theta - \pi/3) & \cos(\theta - \pi/3) \\ \sin\theta & \cos\theta \end{bmatrix} \begin{bmatrix} i_{ds} \\ i_{qs} \end{bmatrix}$$

and the inverse transform may incorporate the matrix product:

$$\begin{bmatrix} \sin(\theta - \pi/3) & \sin\theta \\ \cos(\theta - \pi/3) & \cos\theta \end{bmatrix} \begin{bmatrix} i_{as} \\ i_{cs} \end{bmatrix}$$

There are preferably included means for calculating from the actual components in respect of the stator M.M.F. the corresponding components in respect of the rotor M.M.F., means for deriving from the stator and rotor actual components a signal representative of the actual torque, and means for comparing this actual torque signal with a torque reference signal in the closed control loop.

Several motor control systems will now be described, by way of example, with reference to the accompanying drawings, of which:

FIGS. 6 and 7 illustrate a cyclo-converter induction motor drive with control in accordance with FIGS. 4 and 5 respectively.

In an induction motor, as in other electric motors, in controlling the instantaneous torque it is necessary to control the amplitude and space phase relationship between the stator and rotor magnetomotive forces (M.M.F.'s). An essential feature of the present invention is that the stator M.M.F. is resolved in a reference frame fixed, arbitrarily, with respect to the rotor. Since the rotor rotates at a speed which differs from that of the stator M.M.F. by the slip frequency, the stator M.M.F. can be defined by the resultant of orthogonal components, aligned with the axes of the rotor frame and varying in magnitude according to the sine and cosine of $\omega t$, where $\omega$ is the slip frequency. At constant slip frequency, $\omega t$ can be seen to be an accrued value of the angle through which the rotor has slipped relative to the stator M.M.F. This slip angle will be designated $\phi$.

The two orthogonal components are referred to as the direct and quadrature components and designated $i_{ds}$ and $i_{qs}$, the corresponding components of the rotor M.M.F. being $i_{dr}$ and $i_{qr}$ referred to the same axes.

From the above, $i_{ds} = I \cos\phi$ and $$i_{qs} = I \sin \phi$$

where I is the resultant stator M.M.F.

A required torque can therefore be obtained by control of the stator current amplitude (I) and the slip frequency, and therefore by specifying the direct and quadrature components $i_{ds}$ and $i_{qs}$, and the slip angle.

The required or 'demand' components thus specified are designated $i_{ds}^*$ and $i_{qs}^*$, to distinguish from the component values actually arising.

Once the values $i_{ds}$ and $i_{qs}$ are established, the individual stator phase currents $i_a$ $i_b$ and $i_c$ can be obtained by the following transformation:

$$\begin{bmatrix} i_{as} \\ i_{bs} \\ i_{cs} \end{bmatrix} = \sqrt{2/3} \begin{bmatrix} \cos\theta & -\sin\theta \\ \cos(\theta - 2\pi/3) & -\sin(\theta - 2\pi/3) \\ \cos(\theta + 2\pi/3) & -\sin(\theta + 2\pi/3) \end{bmatrix} \begin{bmatrix} i_{ds} \\ i_{qs} \end{bmatrix}$$

Thus $i_{as} = \sqrt{2/3}\,(i_{ds}\cos\theta - i_{qs}\sin\theta)$, and similarly for $i_{bs}$ and $i_{cs}$.

More briefly, $$[i_{abc}] = [C][i_{dq}]$$

The angle $\theta$ is the rotor position angle mentioned above and determined by a position encoder mounted on the motor shaft.

Figure 1:
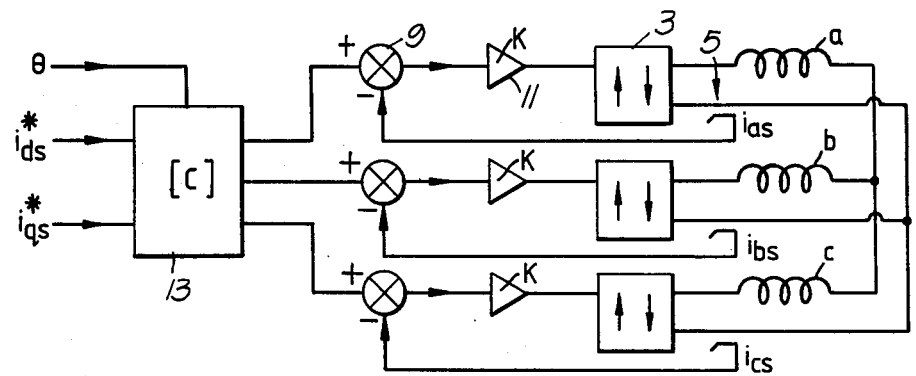
FIG. 1 is a block diagram of a direct control system for a three-phase induction motor employing magneto-motive-force (M.M.F.) rotating axis transformation in the 'forward direction' only.

Referring to FIG. 1, an induction motor has three phase windings a, b and c in star connection, these being supplied by a thyristor power amplifier/convertor represented by blocks 3. Each motor phase current, $i_{as}$ etc, is controlled by a closed loop including a current transformer 5, a unit gain feedback path 7, a differencing circuit 9 and an amplifier 11, the latter providing the forward path compensation.

The reference, or drive signal input to the differencing circuit 9 is derived from a forward transform circuit 13. This circuit is provided with the rotor angle signal $\theta$ and the orthogonal demand components $i_{ds}^*$ and $i_{qs}^*$ and produces the transformation given above.

In this direct control system each control loop is required to track its oscillating reference signal with acceptably small errors.

Figure 2:
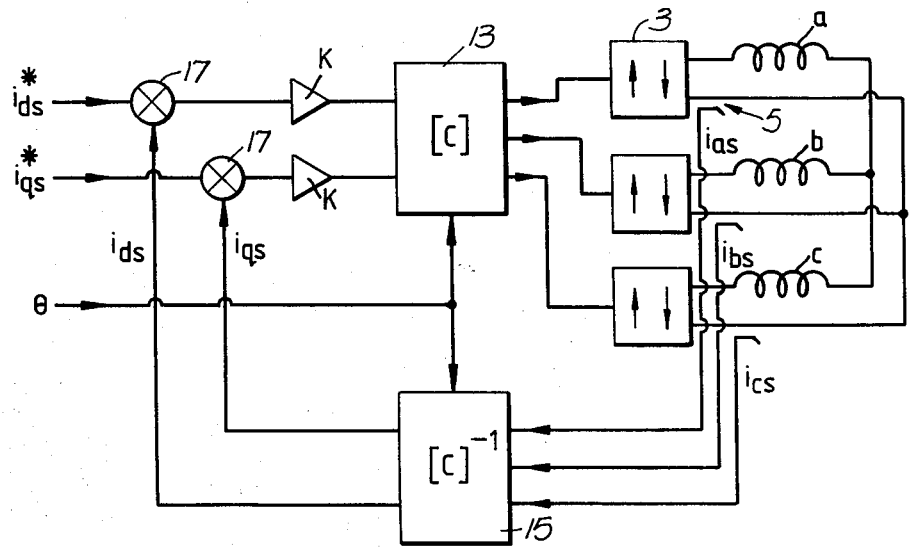
FIG. 2 is a similar block diagram in which feedback is provided by an inverse rotating axis transformation.

FIG. 2 shows a similar motor arrangement with feedback of the phase currents, but in this case the feedback signals are converted by the inverse C transformation (indicated as $C^{-1}$ in block 15) to feedback values in the rotating reference frame. The transformed feedback values $i_{ds}$ and $i_{qs}$ are subtracted from the corresponding demand values $i_{ds}^*$ and $i_{qs}^*$ in differencing circuits 17 to provide signals for the forward transformation. In this case these error signals emerge as voltage inputs to the power amplifiers 3, the voltage signals being given by the following matrix relation which can be seen as the series effect of the loop components.

$$[V_{abc}] = [C]\,K\,[[i_{dq}^*] - [C]^{-1}[i_{abc}]]$$

Unfortunately, the amount of real-time computation required for this derivation of the motor phase voltages may be considered excessive. In this case the derivation can be simplified considerably by use of the constraint $$i_{as} + i_{bs} + i_{cs} = 0$$

This assumes that the phase currents contain no instantaneous zero sequence components.

On this assumption the inverse transformation becomes:

$$[i_{dq}] = -\sqrt{2}\begin{bmatrix} \sin(\theta - \pi/3) & \sin\theta \\ \cos(\theta - \pi/3) & \cos\theta \end{bmatrix}\begin{bmatrix} i_{as} \\ i_{cs} \end{bmatrix} \quad \text{Eq. (1)}$$

and the forward transformation becomes:

$$\begin{bmatrix} i_{as} \\ i_{cs} \end{bmatrix} = \frac{\sqrt{2}}{3}\begin{bmatrix} -2 & 1 \\ 1 & -2 \end{bmatrix}\begin{bmatrix} \sin(\theta - \pi/3) & \cos(\theta - \pi/3) \\ \sin\theta & \cos\theta \end{bmatrix}[i_{dq}^*] \quad \text{Eq. (2)}$$

which, on expansion gives:

$$i_{as} = \frac{\sqrt{2}}{3}\,[i_{ds}^*\{2\sin(\theta - \pi/3) + \sin\theta\} + i_{qs}^*\{-2\cos(\theta - \pi/3) + \cos\theta\}]$$

and, $$i_{cs} = \frac{\sqrt{2}}{3}\,[i_{ds}^*\{\sin(\theta - \pi/3) - 2\sin\theta\} + i_{qs}^*\{\cos(\theta - \pi/3) - 2\cos\theta\}]$$

The remaining phase current $i_{bs}$ is then given by:

$$i_{bs} = -(i_{as} + i_{cs})$$

Figure 3:
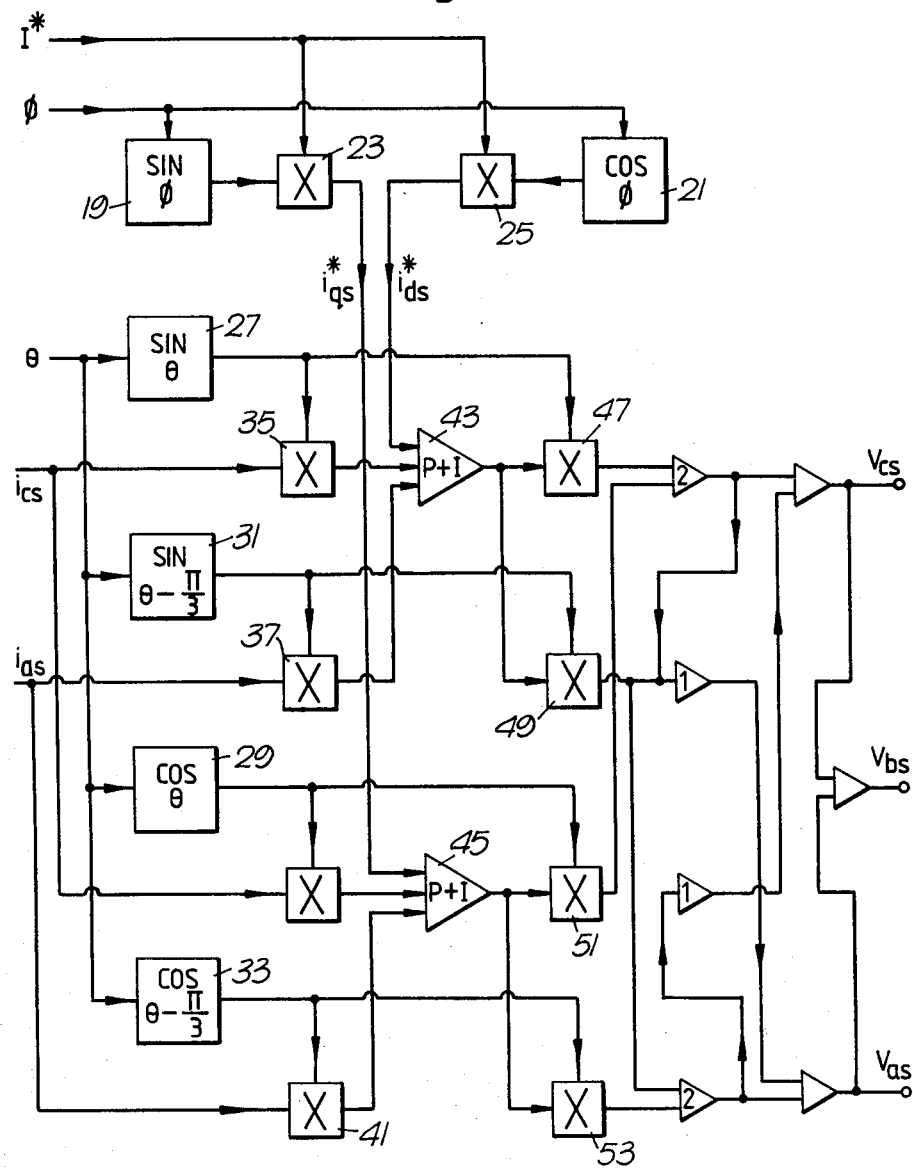
FIG. 3 is a block diagram of transformation circuitry incorporating both forward and inverse transformations consistent with FIG. 2.

These simplified transformations are incorporated in the controller of FIG. 3 which provides voltage signals $V_{cs}$ and $V_{as}$ to the respective power amplifiers 3, the remaining voltage signal $V_{bs}$ being obtained as the negative sum of $V_{cs}$ and $V_{as}$.

The torque demand is specified in terms of I* and $\phi$, i.e., the resultant stator MMF and the accured slip angle. Sine and cosine functions of $\phi$ are derived by analogue circuits or digital 'look-up' tables 19 and 21, the results being multiplied by I* in circuits 23 and 25 to give $i_{qs}^*$ and $i_{ds}^*$ respectively.

Also provided for the controller are the rotor angle $\theta$ from a shaft position encoder and two of the stator phase currents $i_{cs}$ and $i_{as}$.

Again, analogue circuits or digital look-up tables (with corresponding input and output signals) 27, 29, 31 and 33 are employed to derive the sine and cosine of $\theta$ and the sine and cosine of $(\theta - \pi/3)$. The products from equation (3) above are then provided by the multipliers 35, 37, 39 and 41. Multipliers 35 and 37 may be seen to give (together) the feedback value $i_{ds}$ which is subtracted from the demand value $i_{ds}^*$ in the summing amplifier 43 (P & I indicating proportional and integral). Similarly $i_{qs}$ is subtracted from $i_{qs}^*$ in the summing amplifier 45.

These amplifiers 43 and 45 thus correspond to the differencing circuits 17 in FIG. 2.

The forward transformation of equation (4) is then obtained by the multipliers 47, 49, 51 and 53 which give, respectively, $i_{ds}^* \sin\theta$, $i_{qs}^* \cos\theta$, $i_{ds}^* \sin(\theta - /3)$ and $i_{qs}^* \cos(\theta - \pi/3)$. Further combination by amplifiers and inverters gives the required phase voltages $V_{cs}$, $V_{bs}$ and $V_{as}$ for application to the power amplifiers 3.

The realisation in FIG. 3 of a controller employing a 2×2 matrix (Equations 1 and 2) instead of the full 3×3 matrix produces a very practical system which can be accomodated by a microprocessor. The microprocessor may do all the organisation of the system in addition to the provision of sine and cosine values from look-up tables. It also handles the slip frequency resolution and other look-up tables associated with the induction motor control system.

Figure 4A:
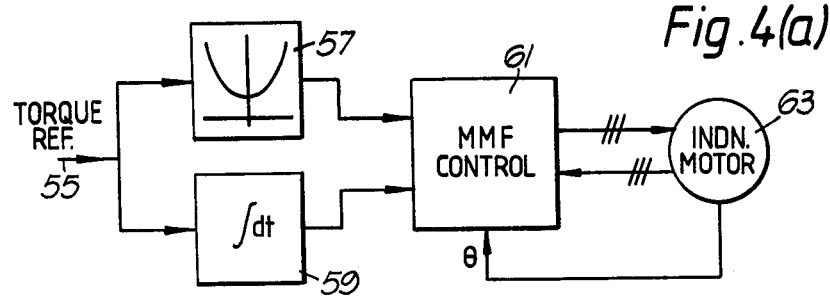
FIG. 4a to FIG. 4b illustrates a system such as that of FIG. 2 and FIG. 3 and the corresponding waveforms of the M.M.F. components and the motor torque.
Figure 4B:
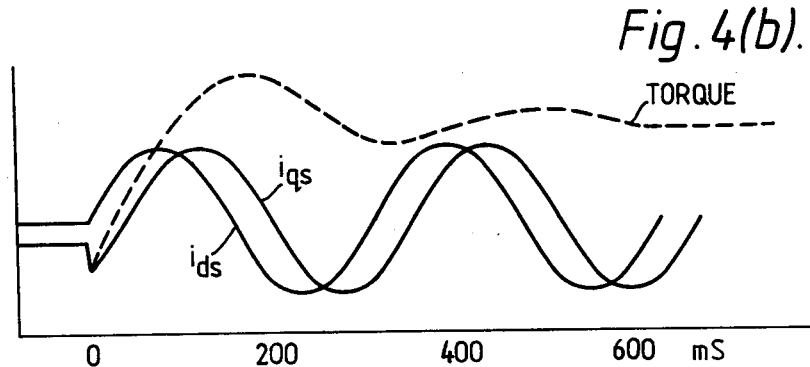
Figure 5A:
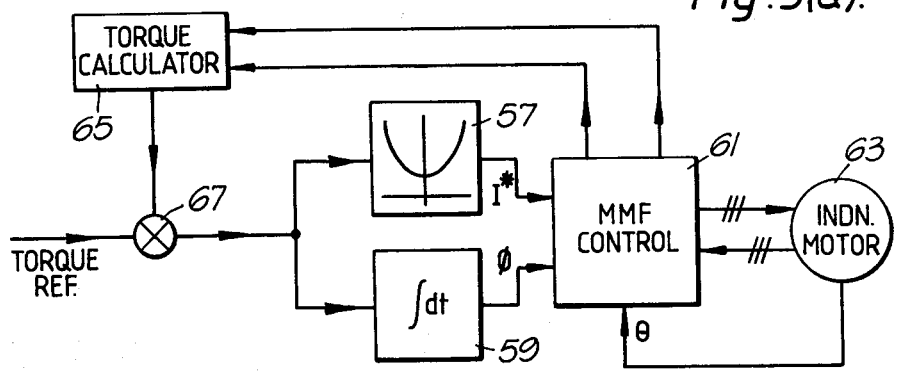
FIG. 5a and FIG. 5b illustrates a contrasting system in which orthogonal stator M.M.F. components are extracted for torque calculation and direct torque control.

FIGS. 4 and 5 show alternative methods of torque control of an induction motor both based on a controller such as illustrated in FIG. 3. In FIG. 4 the torque reference input controls the stator MMF demand, which in turn controls, as described above, the stator phase voltages. The torque reference input 55, which corresponds to slip frequency, is applied to a transfer circuit 57 relating total stator MMF (I) to the slip frequency at constant stator flux linkage.

In addition, the slip frequency, $\omega$, is integrated to give $\omega t$, or $\phi$, the accured slip angle, by integrator 59. These demand values, of I* and $\phi$ are applied to the M.M.F. control 61 as in FIG. 3. The motor 63 is driven by the power amplifiers 3 (FIG. 2) and provides feedback of the phase current values $i_{as}$ and $i_{cs}$, and of the rotor angle $\theta$, as required by the controller.

FIG. 4(b) shows the torque value achieved and the corresponding oscillating values of $i_{ds}$ and $i_{qs}$. Torque control by this method leaves something to be desired although it is adequate for certain applications.

In FIG. 5 a similar inner control is used but the orthogonal component values $i_{ds}$ and $i_{qs}$ which actually arise, and which are derived in the inputs of amplifiers 43 and 45 in FIG. 3, are used in a torque calculator 65 to provide an actual torque value. This is compared with, or subtracted from, a demand torque value in a differencing circuit 67. The error signal is then converted to total M.M.F. and accrued angle values, as in FIG. 4.

Figure 5B:
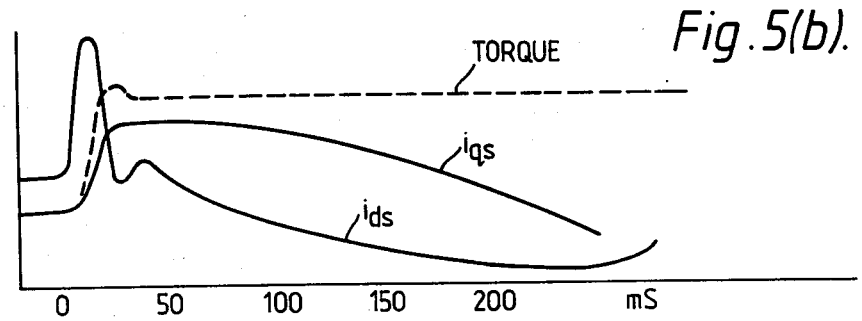

FIG. 5(b) shows the improvement in the acquisition of a steady torque and the absence of oscillation of the M.M.F. components.

The improved torque control of FIG. 5 is a feature of this embodiment of the invention and results from the relatively simple relationship that exists between the stator M.M.F. components and the rotor M.M.F. components in a rotor based reference frame. The relationship follows:

$$i_{dr} = \frac{Kp}{1 + T_r p} i_{ds}$$

and $$i_{qr} = \frac{Kp}{1 + T_r p} i_{qs}$$

where K is a constant, $T_r$ is the rotor time constant, and p is the operator d/dt.

These relationships allow very simple torque calculations, i.e.

$$T = K(i_{qs} i_{dr} - i_{ds} i_{qr})$$

Only in the rotor reference frame is the torque calculation so easily achieved.

Having calculated the torque in this way it becomes a simple matter to close a torque loop, as shown in FIG. 5, which eliminates the slip frequency components associated with M.M.F. control above.

Figure 6:
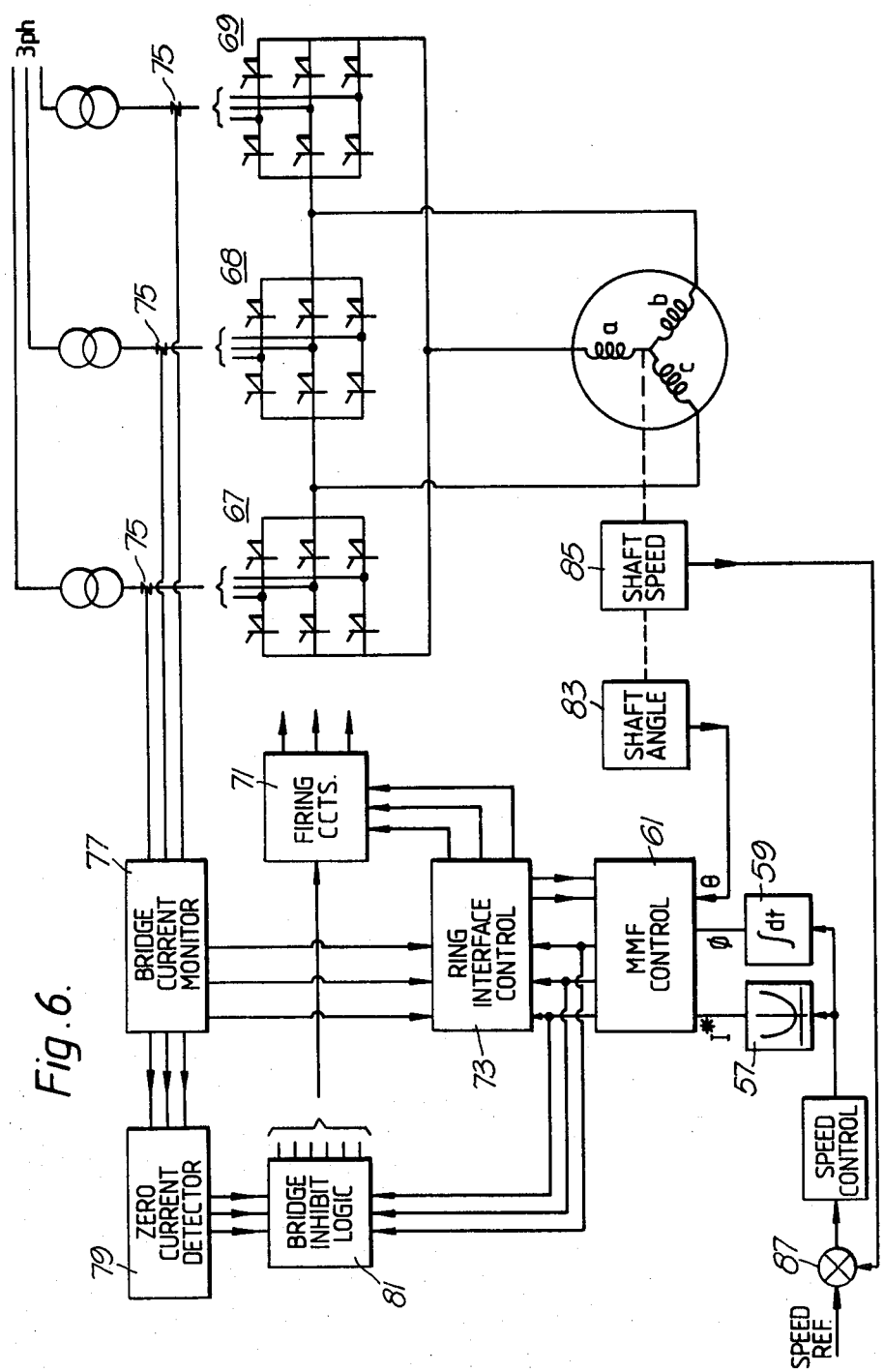

FIG. 6 shows a schematic diagram of a complete induction motor drive circuit using a ring-connected cycloconvertor.

A 3-phase supply is connected to a cycloconvertor comprising three 3-phase thyristor bridges 67, 68 and 69, fed in parallel from the supply. The d.c. outputs of the bridges are connected in series and the star connected stator phase windings a, b and c are connected to the bridge interconnections. The bridge thrysitors are fired by a firing circuit 71 which is controlled from a ring interface control circuit 73. This circuit receives the stator phase voltages $V_{as}$ $V_{bs}$ and $V_{cs}$ from the M.M.F. control 61 and relays the actual stator phase currents $i_{as}$ and $i_{cs}$, the latter being derived from current transformers 75, by way of a bridge current monitoring circuit 77. Conventional zero current detection (79) and bridge inhibit circuitry (81) is also provided.

The rotor angle $\theta$ is determined by shaft angle transducer 83, and the rotor velocity by a shaft speed transducer 85. The rotor angle signal $\theta$ is applied to the M.M.F. control circuit 61 and the shaft speed signal is applied to a differencing circuit 87 where it is subtracted from a speed reference signal. The error output of the circuit 87 is applied to a speed control circuit 89 to derive a required slip frequency signal which is then applied to a transfer circuit 57 and to an integrating circuit 59 as explained with reference to FIG. 4. These circuits provide the total M.M.F. demand signal I* and the accrued slip-angle signal $\phi$ for the M.M.F. control circuit 61.

The circuit of FIG. 6 operates in accordance with FIG. 4 to provide direct M.M.F. control of the stator phase voltages and hence the stator M.M.F.

FIG. 7 shows a similar induction motor drive circuit but modified in accordance with FIG. 5. The calculated torque feedback, from box 65, is compared in a differencing circuit 67 with, either, a torque reference signal or a required torque signal derived from a speed comparison.

This drive circuit therefore takes full advantage of the invention, providing an economic drive with rapid response to torque requirements.

We claim:

1. A control system for controlling an induction motor,
   (I) via the stator only, in dependence upon a control signal,
   (II) said induction motor comprising:
      (A) a stator
         (a) provided with a plurality of phase windings
         (b) fed with alternating current for generating a rotating m.m.f. and
      (B) a rotor mounted within said stator for rotation under the influence of said rotating m.m.f.,
      (C) said control system for controlling the induction motor via the stator only in dependence upon a control signal comprising:
      (1) first control means responsive to said control signal for generating first and second demand signals representative of the desired amplitude of said current and of the desired accrued angle of slip of said m.m.f. relative to said rotor;
      (2) second control means for resolving said first demand signal into orthogonal demand components proportional to the sine and cosine respectively of said desired accrued angle of slip;

(3) third control means for generating a rotor angle signal representative of the angular position of said rotor relative to said stator;

(4) forward transform means responsive to said rotor angle signal and to said orthogonal demand componnts to produce equivalent phase-winding drive signals; and (5) means controlled by said phase winding drive signals for feeding said alternating current to said phase windings in a controlled manner.

2. A control system as claimed in claim 1, further comprising means coupled to said phase windings for providing respective negative feedback signals representative of actual phase winding currents and means for combining each of said stator winding drive signals with a corresponding one of said negative feedback signals to provide direct control of said rotating m.m.f.

3. A control system as claimed in claim 1, further comprising means coupled to said phase windings for providing respective phase current signals representative of actual phase winding currents, inverse transform means responsive to said rotor angle signal and to said phase current signals for resolving said phase current signals into equivalent orthogonal components in a rotor reference frame and means for subtracting said orthogonal components from said demand signals so as to form a closed control loop.

4. A control system according to claim 3 for a system in which the motor stator carries no zero sequence component and in which one of said stator-winding drive signals is derived as the negative sum of the remainder.

5. A control system according to claim 4, wherein the forward transform providing stator phase current values $i_{as}$ and $i_{cs}$ in terms of the orthogonal rotor-referenced components $i_{ds}$ and $i_{qs}$ incorporates the matrix form:

$$\begin{bmatrix} \sin(\theta - \pi/3) & \cos(\theta - \pi/3) \\ \sin\theta & \cos\theta \end{bmatrix} \begin{bmatrix} i_{ds} \\ i_{qs} \end{bmatrix}$$

and the inverse transform incorporates the matrix product:

$$\begin{bmatrix} \sin(\theta - \pi/3) & \sin\theta \\ \cos(\theta - \pi/3) & \cos\theta \end{bmatrix} \begin{bmatrix} i_{as} \\ i_{cs} \end{bmatrix}$$

6. A control system according to claim 2, including means for calculating from said actual components in respect of the stator m.m.f. the corresponding components in respect of the rotor m.m.f., means for deriving from the stator and rotor actual components a signal representative of the actual torque, and means for comparing this actual torque signal with a torque reference signal in said closed control loop.

7. A control system according to claim 3, including means for calculating from said actual components in respect of the stator m.m.f. the corresponding components in respect of the rotor m.m.f., means for deriving from the stator and rotor actual components a signal representative of the actual torque, and means for comparing this actual torque signal with a torque reference signal in said closed control loop.

8. A control system as claimed in claim 1, further comprising means coupled to the motor for deriving a torque feedback signal representative of actual motor torque, wherein said control signal is a torque reference signal and said first control means is arranged to difference said torque feedback and torque reference signals and to generate said first and second demand signals tending to minimize said difference.

* * * * *